United States Patent
Wabnig et al.

(10) Patent No.: US 10,846,611 B2
(45) Date of Patent: Nov. 24, 2020

(54) DATA PROCESSING

(71) Applicant: Nokia Technologies Oy, Espoo (FI)

(72) Inventors: Joachim Wabnig, Cambridge (GB);
Antti Niskanen, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 830 days.

(21) Appl. No.: 15/317,620

(22) PCT Filed: Jun. 16, 2014

(86) PCT No.: PCT/FI2014/050478
§ 371 (c)(1),
(2) Date: Dec. 9, 2016

(87) PCT Pub. No.: WO2015/193531
PCT Pub. Date: Dec. 23, 2015

(65) Prior Publication Data
US 2017/0140298 A1 May 18, 2017

(51) Int. Cl.
*G06N 20/00* (2019.01)
*G06N 10/00* (2019.01)
(Continued)

(52) U.S. Cl.
CPC ........... *G06N 20/00* (2019.01); *G06N 3/0445* (2013.01); *G06N 7/005* (2013.01); *G06N 10/00* (2019.01)

(58) Field of Classification Search
CPC ...... G06N 20/00; G06N 10/00; G06N 3/0445; G06N 7/005
See application file for complete search history.

(56) References Cited

U.S. PATENT DOCUMENTS 5,185,848 A  2/1993 Aritsuka
5,303,328 A  4/1994 Masui et al.
(Continued)

FOREIGN PATENT DOCUMENTS

JP    5250346      7/2013
WO   01/69410 A1  9/2001

OTHER PUBLICATIONS

Daniel L. Ly and P. Chow, "High-Performance Reconfigurable Hardware Architecture for Restricted Boltzmann Machines," in IEEE Transactions on Neural Networks, vol. 21, No. 11, pp. 1780-1792, Nov. 2010. (Year: 2010).*
(Continued)

*Primary Examiner* — Kakali Chaki
*Assistant Examiner* — Vasyl Dykyy
(74) *Attorney, Agent, or Firm* — Harrington & Smith

(57) ABSTRACT

A data processing system is disclosed for machine learning. The system comprises a sampling module (13) and a computational module (15) interconnected by a data communications link (17). The computational module is configured to store a parameter vector representing an energy function of a network having a plurality of visible units connected using links to a plurality of hidden units, each link being a relationship between two units. The sampling module is configured to receive the parameter vector from the first processing module and to sample from the probability distribution defined by the parameter vector to produce state vectors for the network. The computational module is further configured to receive the state vectors from the second processing module and to apply an algorithm to produce new data. The sampling and computational modules are configured to operate independently from one another.

18 Claims, 5 Drawing Sheets

(51) Int. Cl.
    *G06N 7/00*        (2006.01)
    *G06N 3/04*        (2006.01)

(56) References Cited

U.S. PATENT DOCUMENTS

| | | | |
|---|---|---|---|
| 5,956,702 A | 9/1999 | Matsuoka et al. | |
| 7,773,800 B2 | 8/2010 | Liu | |
| 8,332,367 B2 * | 12/2012 | Bhattacherjee | G06F 16/24556 707/692 |
| 2011/0112997 A1 * | 5/2011 | Sabe | G06N 20/00 706/12 |
| 2014/0187427 A1 * | 7/2014 | Macready | G06N 5/02 505/170 |
| 2014/0310218 A1 * | 10/2014 | Min | G06N 3/08 706/16 |

OTHER PUBLICATIONS

Misha D. and Nando. D. F, "Toward the Implementation of a Quantum RBM" University of British Columbia, Computer Science, pp. 1-9, 2011. (Year: 2011).*

E. Hinton, Geoffrey. (2010). A Practical Guide to Training Restricted Boltzmann Machines (Version 1). Technical Report UTML TR 2010-003,pp. 1-20, University of Toronto. 9. (Year: 2010).*

International Search Report received for corresponding Patent Cooperation Treaty Application No. PCT/FI2014/050478, dated Mar. 26, 2015, 4 pages.

Salakhutdinov, R., Hington, G., "Deep Boltzmann Machines", in Proceedings of the Twelfth International Conference on Artificial Intelligence and Statistics, Apr. 16-18, 2009, pp. 448-455.

Barra, A., Bemacchia, A., Santucci, E., Contucci, P., "On the equivalence of Hopfield Networks and Boltzmann Machines", Jan. 10, 2012.

\* cited by examiner

HYBRID MACHINE

HYBRID MACHINE

DATA PROCESSING

RELATED APPLICATION

This application was original filed as Patent Cooperation Treaty Application No. PCT/FI2014/050478 filed Jun. 16, 2014.

FIELD OF THE INVENTION

This invention relates to data processing, particularly in the field of machine learning.

BACKGROUND OF THE INVENTION

Machine learning methods and systems are used to generate a set of data-dependent results based on a training or learning stage. A neural network is a type of machine learning system, a particular type of which is called a Boltzmann machine, which is a stochastic model comprising visible and hidden units that can take the values '0' or '1' with given probability. The visible units are used to represent the data, and the hidden units are used for modeling. Each possible state of the machine may be assigned an energy value E and a probability distribution for all states can be fully defined by an energy function. By adjusting parameters in the energy function, it is possible to manipulate the probability distribution over all of the units.

In the learning stage, the parameters are adjusted so that the marginal probability distribution over the visible units is close to that of an example, or reference, probability distribution. After learning, the machine can be used to make predictions based on the learned data.

In practical terms, Boltzmann machines can be used for any type of operation where a predicted set of data is required based on a modeled system, for example in image or audio analysis. The process is typically slow, however, due to computational requirements.

SUMMARY OF THE INVENTION

A first aspect of the invention provides a method comprising: storing in a first processing module a parameter vector representing an energy function of a network having a plurality of visible units connected using links to a plurality of hidden units, each link being a relationship between two units; in a separate, second processing module, receiving the parameter vector from the first processing module and sampling from the probability distribution defined by the parameter vector to produce state vectors for the network; and in the first processing module, receiving the state vectors from the second processing module and applying an algorithm to produce new data, the method comprising performing the sampling independently from the producing the new data.

The method may comprise sampling and producing the new data at least partially in parallel.

The method may comprise sampling and producing the new data asynchronously to each other.

The method may comprise sampling and/or producing the new data until a predetermined condition is reached, at which time data is exchanged from one processing module to the other processing module.

Applying the algorithm may comprise applying a learning algorithm to produce an updated parameter vector that is subsequently sent to the second processing module for re-sampling when the predetermined condition is reached.

The method may comprise sending the updated parameter vector to the second processing module for re-sampling when a predetermined plural number of iterations of the learning algorithm have been performed.

The learning algorithm may be a gradient-based learning algorithm that iterates over plural learning steps to produce an estimated optimized result with respect to reference data.

The learning algorithm may be the Kullback-Leibler (KL)-divergence algorithm.

Sampling may comprise sampling until a predetermined number of samples have been obtained, at which time sending the state vectors represented by the samples are sent to the first processing module.

The method may comprise issuing a control signal from one of the processing modules to the other when the predetermined condition is reached to enable the exchange of data.

The algorithm may take as input the state vectors and the parameter vector to generate output data representing a probability distribution.

The method may comprise buffering the samples received prior to applying the algorithm.

The method may comprise processing the buffered samples to remove duplicate state vectors prior to applying the algorithm.

The method may comprise sorting the processed state vectors into a predetermined order prior to applying the algorithm.

The method may comprise using at least two samplers to generate the state vectors and, prior to applying the algorithm, receiving the sampled output from each and removing duplicates.

Each sampler may use a different sampling method.

The first and second processing modules may be implemented on different hardware modules having their own microprocessor or microcontroller.

Each processing module may be implemented on a respective ASIC or FPGA.

One of said processing modules may be implemented on an ASIC or FPGA and the other on a multi-purpose computer system having its own microprocessor or microcontroller.

The second processing module may be implemented as a quantum annealing machine.

The first and second processing modules may exchange data over a non-dedicated data communications link, e.g. the Internet.

The first and second processing modules may be physically remote from one another.

The method may comprise receiving from a wireless terminal input data for use in the algorithm to generate the new data.

A second aspect of the invention provides a system comprising: a first processing module configured to store a parameter vector representing an energy function of a network having a plurality of visible units connected using links to a plurality of hidden units, each link being a relationship between two units; and a second processing module configured to receive the parameter vector from the first processing module and to sample from the probability distribution defined by the parameter vector to produce state vectors for the network; the first processing module being further configured to receive the state vectors from the second processing module and to apply an algorithm to produce new data; wherein the processing modules are configured to sample and produce the new data independently from one another.

The processing modules may be configured to sample and produce the new data at least partially in parallel.

The processing modules may be configured to sample and produce the new data asynchronously to each other.

The processing modules may be configured to sample and/or produce the new data until a predetermined condition is reached, at which time data is exchanged between the two processing modules.

The first processing module may be configured to apply a learning algorithm to produce an updated parameter vector and subsequently to send it to the second processing module for re-sampling when the predetermined condition is reached.

The first processing module may be configured to send the updated parameter vector to the second processing module for re-sampling when a predetermined plural number of iterations of the learning algorithm have been performed.

The first processing module may be configured to perform a gradient-based learning algorithm that iterates over plural learning steps to produce an estimated optimized result with respect to reference data.

The first processing module may be configured to perform the KL-divergence algorithm.

The second processing module may be configured to sample until a predetermined number of samples have been obtained, at which time it sends the state vectors represented by the samples are sent to the first processing module.

One of the first or second processing modules may be configured to issue a control signal to the other when the predetermined condition is reached to enable the exchange of data.

The first processing module may be configured to take as input the state vectors and the parameter vector, and to generate output data representing a probability distribution.

The first processing module may be configured to buffer the samples received prior to applying the algorithm.

The first processing module may be configured to buffer the samples to remove duplicate state vectors prior to applying the algorithm.

The first processing module may be configured to sort the processed state vectors into a predetermined order prior to applying the algorithm.

The second processing module may comprise at least two samplers configured to generate the state vectors and, prior to applying the algorithm, to receive the sampled output from each and to remove duplicates.

Each sampler may be configured to use a different sampling method.

The first and second processing modules may be implemented on different hardware modules having their own microprocessor or microcontroller.

Each processing module may be implemented on a respective ASIC or FPGA.

One of said processing modules may be implemented on an ASIC or FPGA and the other on a multi-purpose computer system having its own microprocessor or microcontroller.

The second processing module may be implemented as a quantum annealing machine.

The first and second processing modules may be configured to exchange data over a non-dedicated data communications link, e.g. the Internet.

The first and second processing modules may be physically remote from one another.

The system may be configured to receive from a wireless terminal input data for use in the algorithm to generate the new data.

A third aspect of the invention provides a computer program comprising instructions that when executed by a computer apparatus control it to perform the method of: storing in a first processing module a parameter vector representing an energy function of a network having a plurality of visible units connected using links to a plurality of hidden units, each link being a relationship between two units; in a separate, second processing module, receiving the parameter vector from the first processing module and sampling from the probability distribution defined by the parameter vector to produce state vectors for the network; in the first processing module, receiving the state vectors from the second processing module and applying an algorithm to produce new data; and performing the sampling independently from the producing the new data.

A fourth aspect of the invention provides a non-transitory computer-readable storage medium having stored thereon computer-readable code, which, when executed by computing apparatus, causes the computing apparatus to perform a method comprising: storing in a first processing module a parameter vector representing an energy function of a network having a plurality of visible units connected using links to a plurality of hidden units, each link being a relationship between two units; in a separate, second processing module, receiving the parameter vector from the first processing module and sampling from the probability distribution defined by the parameter vector to produce state vectors for the network; in the first processing module, receiving the state vectors from the second processing module and applying an algorithm to produce new data; and performing the sampling independently from the producing the new data.

BRIEF DESCRIPTION OF THE DRAWINGS

The invention will now be described, by way of non-limiting example, with example to preferred embodiments, in which.

DETAILED DESCRIPTION OF SOME EMBODIMENTS

Embodiments herein describe systems and methods implementing a Boltzmann machine neural network for machine learning.

The system employs a hybrid architecture consisting of separate sampling and computational modules, which are able to operate independently, to improve performance. The system employs data structures and computational algorithms for implementing the operation of a Boltzmann machine. An overview of a Boltzmann machine will first be introduced.

Figure 1:
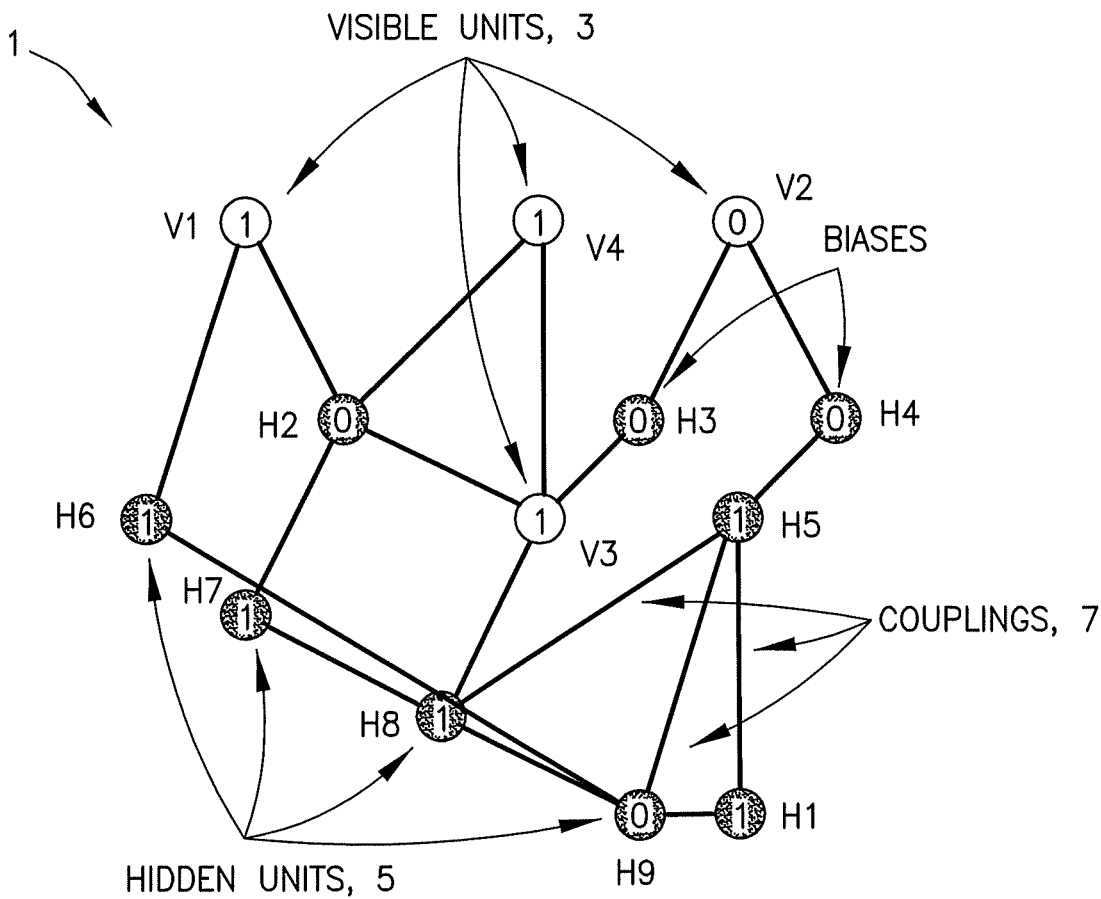
FIG. 1 is a graphical representation of a Boltzmann machine neural network.

FIG. 1 is a graphical representation of a Boltzmann machine 1, which comprises visible units 3 (or nodes) and hidden units 5. The visible units 3 represent the data and the hidden units 5 are used for modeling. The units 3, 5 can take the value '0' or '1' with a given probability. Each possible state of the machine 1 may be assigned an energy value E and a probability distribution for all states can be fully defined by an energy function. By adjusting parameters in the energy function, it is possible to manipulate the probability distribution over all of the units 3, 5.

The probability of a state is given by $$P=1/Z \, \mathrm{Exp}[-E]$$

where Z is a normalization constant called the partition function. Usually, the energy function is quadratic in the state s=(0, 1, 1, 0, 0, 1, 0, 1 . . . ) of length M, such that $$E=\sum_{i=1}^{M}\sum_{j=1}^{i-1} A_{ij} s_i s_j + \sum_{j=1}^{M} B_j s_j$$

where A is a matrix of dimensions M×M and B is a vector of length M.

In FIG. 1, non-zero elements of the matrix A define a particular connectivity of the machine, i.e. only units i and j with a non-zero $A_{ij}$ are connected, which are represented in FIG. 1 by thick coupling lines 7.

Figure 2:
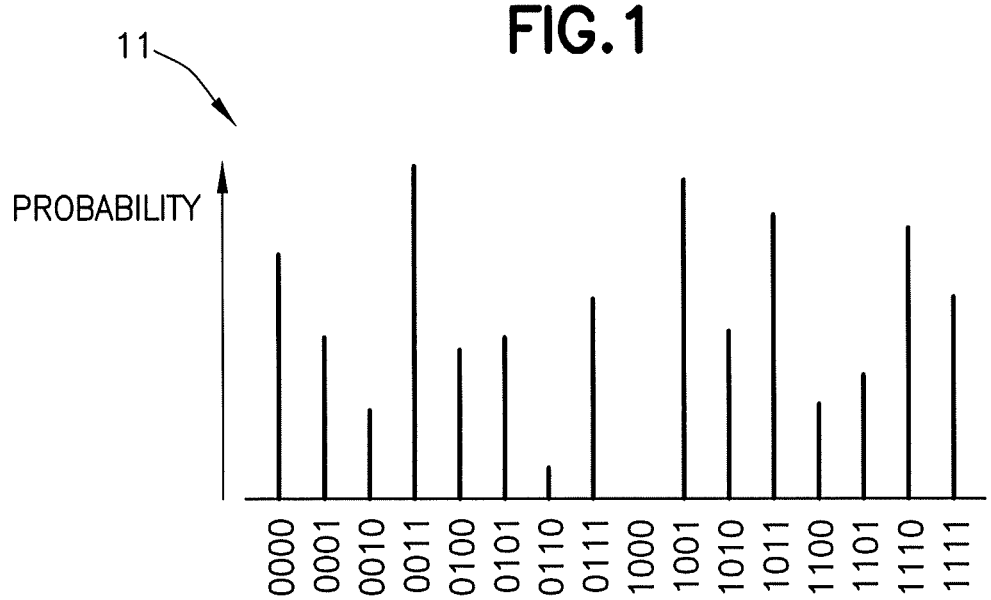
FIG. 2 is a graphical representation of a probability distribution for four visible units of the FIG. 1 neural network.

Usually, one is interested in modeling a given probability distribution (referred to herein as an example, or reference distribution) over the visible units 3. FIG. 2 shows an example binary probability distribution 11 over the four visible units 3, with each bar representing the probability that an associated bit pattern is realized. Boltzmann machines are trained in a so-called learning phase to represent such example binary probability distributions so that, subsequently, in a prediction phase, predicted data is output from the model based on inputs to a subset of the visible units 3. Practical applications of the system include image and audio processing, for example.

In the learning phase, the system parameters in the energy function are adjusted in such a way that a so-called marginal probability distribution p over the visible units 3 is close to the example probability distribution $p^0$ by a certain measure, usually their relative entropy, also called the Kullback-Leibler (KL) divergence, given by $$KL = \sum_{i=0}^{2^{N_v}-1} p_i^{(0)} \log p_i^{(0)} - p_i^{(0)} \log p_i$$

where the number of visible units 3 is given by $N_v$ with the index i running over all possible states of the visible units. The learning phase is usually performed using gradient-based methods (for example, using the so-called gradient descent or conjugate gradient method) where the gradient of the relative entropy is calculated from samples obtained from the machine 1. After learning is completed, the machine 1 is used to make predictions based on the learned data. New data can be presented by fixing the value of part of the visible units 3 ("clamping") and the predictions can be read off using the probability distribution of the remaining visible units.

Figure 3:
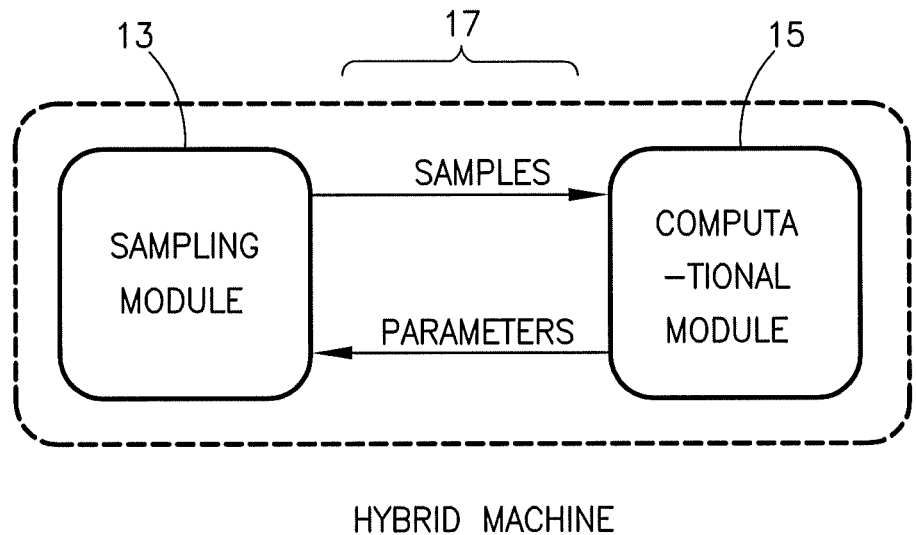
FIG. 3 is a high-level block diagram of a hybrid implementation of the FIG. 1 neural network according to embodiments of the invention.

FIG. 3 shows a first embodiment of a system implementing a Boltzmann machine, comprising separate sampling and computational modules 13, 15 interconnected by a data communications channel 17.

In overview, the sampling module 13 takes as input from the computational module 15 a set of data representing a parameter vector, which is a vector representing couplings between the visible and hidden units 3, 5 and biases for the individual units, and so defines the energy function of the Boltzmann machine 1. The sampling module 13 samples according to the energy function defined by the parameter vector to generate candidate state vectors of the machine 1, which are made available to the computational module 15. The computational module 15 receives and stores the candidate state vectors in memory, buffers them, and uses them with data processing algorithms to perform the learning and, subsequently, the prediction calculations.

The sampling and computational modules 13, 15 are provided as separate, independent processing systems enabling them to be implemented using hardware and/or software appropriate to the respective module's processing requirements, and also to exploit asynchronous and parallel processing to improve performance. Significantly, a number of optimization steps can be performed in the computational module 15 using gradient learning for a currently-stored set of samples before new samples are used for subsequent optimization. The samples can be buffered for this purpose.

Figure 4:
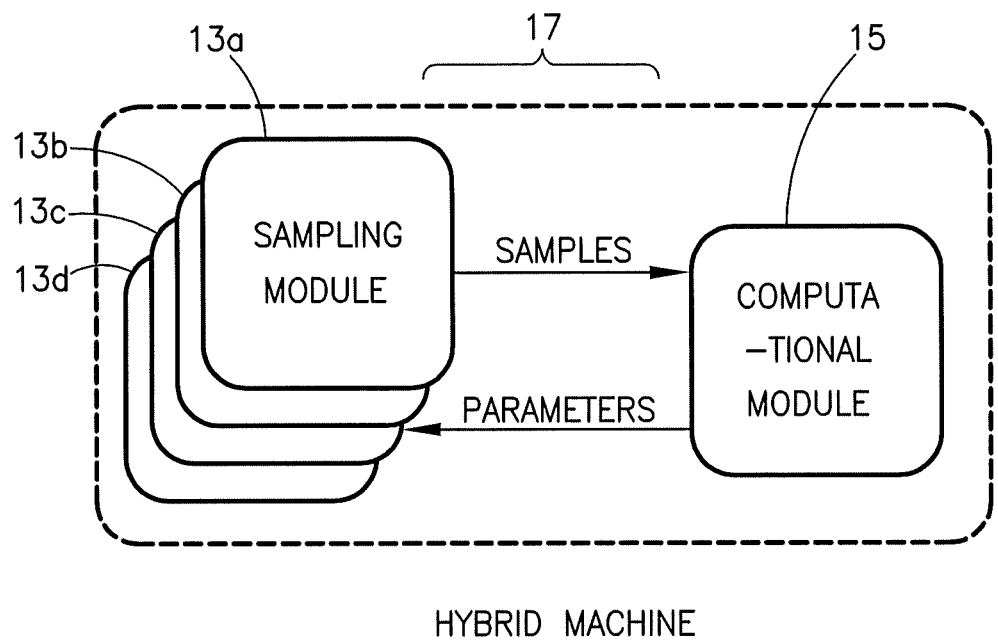
FIG. 4 is a high-level block diagram of a hybrid implementation of the FIG. 1 neural network according to further embodiments of the invention.

FIG. 4 shows that multiple sampling modules 13a-d can be used in parallel. The different sampling modules 13a-d can be made up of different implementations of sampler.

The sampling module 13 can be implemented on conventional hardware, such as a high performance personal computer, using a software-sampling algorithm implementing standard Metropolis sampling, parallel tempering or simulated quantum annealing, amongst others. Alternatively, the sampling module 13 can implement said selected algorithm on a Field Programmable Gate Array (FPGA), an Application Specific Integrated Circuit (ASIC) or using a physical implementation of a Boltzmann machine using bistable units, e.g. Schmitt triggers. Alternatively still, the use of a quantum annealing machine (i.e. hardware instead of software) can realize sampling using quantum mechanical effects.

The computational module 15 can be implemented as a software algorithm on a computer Central Processing Unit (CPU) or a Graphics Processor Unit (GPU), or an algorithm programmed into a FPGA or ASIC.

The sampling and computational modules 13, 15 are interconnected using a suitable data communications channel 17, which can be a broadband Internet connection or a dedicated link. The two modules 13, 15 need not be at the same physical location and can be remote from one another.

Figure 5:
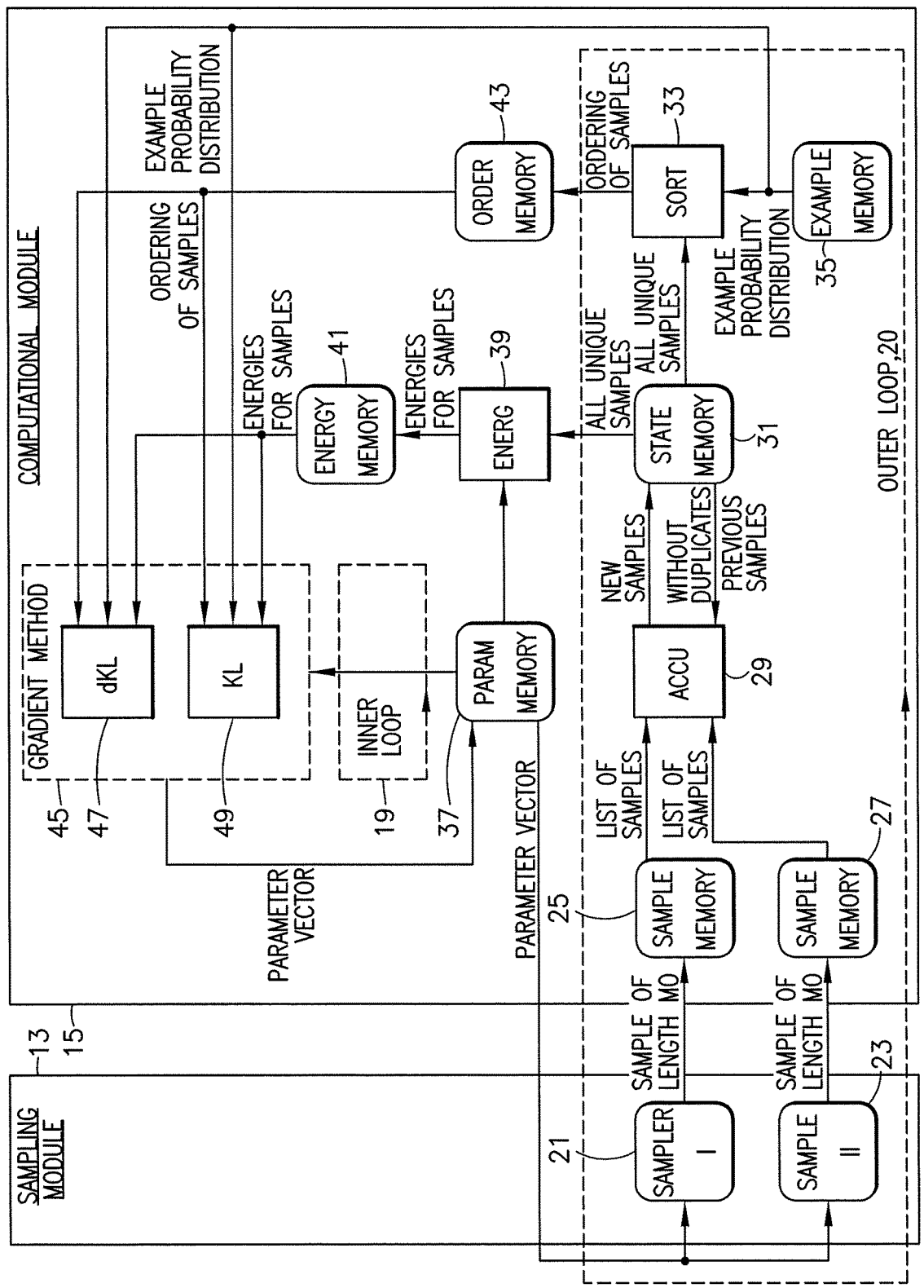
FIG. 5 is a block diagram showing functional modules of the FIG. 3 implementation in a learning mode of operation.
Figure 6:
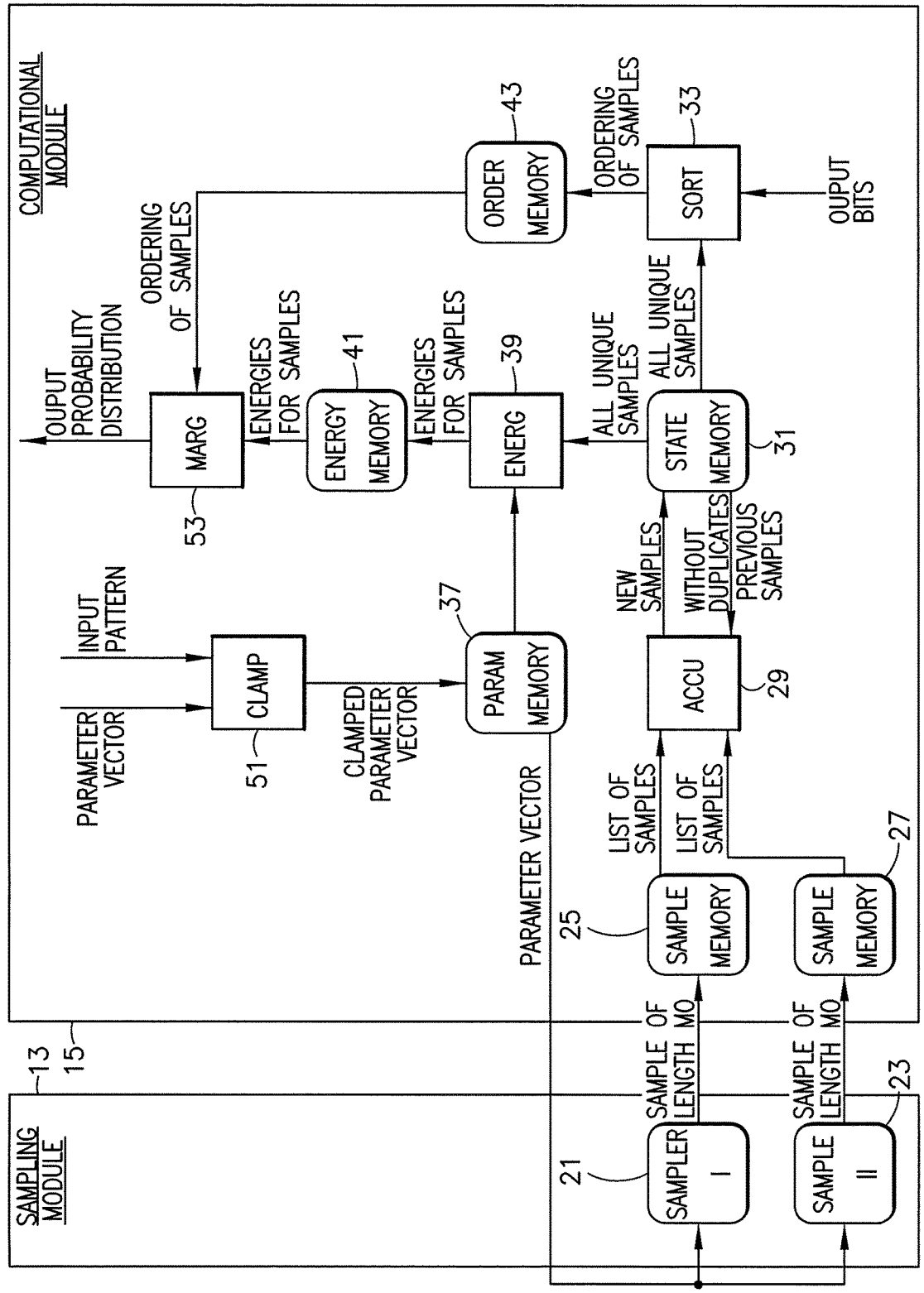
FIG. 6 is a block diagram showing functional modules of the FIG. 3 implementation in a prediction mode of operation.

FIGS. 5 and 6 show functional modules of the sampling and computational modules 13, 15 for implementing the above-described learning and prediction phases. Each module 13, 15 can be implemented using hardware modules, software modules or a combination of both types.

The sampling module 13 provides first and second samplers 21, 23 in this embodiment. Each sampler 21, 23 is configured to receive as input a set of data representing the parameter vector from the computational module 15, to sample from the probability distribution defined by the parameter vector data and to generate candidate state vectors in the form of a sample string of bits (0 or 1), which are made available to the computational module over the communications link 17. The parameter vector is stored in a parameter memory 37. Hardware samplers have a given connectivity and limited precision on the couplings, whereas software samplers can have arbitrary connectivity and high precision on the couplings. Either or both types can be used. The samplers can run in batches. A software sampler can run several samplings in parallel. Software and hardware samplers can produce the samples at different respective rates, and hence the most appropriate form of sampling module or sampling module combination can be used.

Whereas the sampling module 13 operates in the same way during learning and prediction phases, the computational module 15 employs different algorithms in the learning and prediction phases.

Learning Phase

In the learning phase, the aim of the hybrid system and method is to generate a set of parameters so that the marginal probability distribution over the visible units of the Boltzmann machine has a minimum KL-divergence with an example probability distribution, which is represented in data form and is programmed into an example memory 35 of the computational module 15. The initial value of the parameter vector can be set in a number of ways. For example, the parameter vector could initially be a zero vector, representing the machine as having all units uncoupled and unbiased. Alternatively, the initial value could be a random vector with a certain maximum entry. More sophisticated methods can, for example, grow the machine by adding visible and hidden units in the optimization process, and taking a good initial vector from the previous iteration in that process.

Processing works iteratively between an inner processing loop 19, and an outer processing loop 20.

The outer loop 20 proposes candidate state vectors as data, buffers and stores them in a state memory 31; the inner loop 19 takes these states and iteratively tries to adjust the parameter vector to maximize overlap with the example probability distribution (or minimize divergence). This is a form of optimization and, in this embodiment, the known KL-divergence (Kullback-Leibler—divergence) algorithm is employed and implemented in the KL module 45 shown in FIG. 5.

The KL module 45 takes as input the example probability distribution, an ordering of the samples from an order memory 43 and energies for the samples from an energy memory 41. The current parameter vector stored in the parameter memory 37 is also taken as input. The output of the KL module 45 is an updated parameter vector, which is stored in the parameter memory 37 and is iteratively updated during the learning process as the divergence is minimized.

In a Boltzmann machine, the derivative (dKL) 46 of the KL-divergence (KL) 49 with respect to parameters can be calculated directly from the states. A line search in the KL-divergence (KL) 49 establishes an ideal step size along the gradient. Alternatively, a conjugate gradient method can be used.

It is not necessary to obtain new samples for every gradient step, because one would expect the partition function to change slowly if the change in parameters is small. A convenient routine is therefore to take a certain number of gradient steps, e.g. 1000, and then add new states (to the state memory, to be introduced below). Further information on the KL divergence method will be known to the skilled person.

With regard to the outer processing loop 20, the computational module 15 comprises first and second sample memories 25, 27 for receiving and storing the candidate state vectors from the respective first and second samplers 21, 23. The sample memories 25, 27 act as a buffer in view of the fact that the samplers, depending on whether they are implemented in hardware or software, may issue the samples at different rates and with different precision.

An accumulator 29 is provided which takes the list of samples from the two sample memories 25. In the method described, we only need a list of all possible states and not their frequency of occurrence. The accumulator 29 is configured to eliminate all multiples received from the sample memories 25.

The accumulator 29 is connected to a state memory 31, which stores a list of all states that have occurred in the sampling process. The aim is to store a list of eligible states that give a good approximation to the partition function. Sample states already stored in the state memory 31 are made available to the accumulator 29 so that it will only send new sample states. The accumulator 29 may use a more sophisticated algorithm to decide which states to keep. In some embodiments, for example, only the N lowest energy states may be kept. In some embodiments, states from previous samplings may be mixed with states from the current sampling. In some embodiments, the N lowest states of a mixture of states from current and previous samplings may be kept.

A sorting module 33 is provided, and is configured to take the example probability distribution over the visible units from the example memory 35, and to generate a list of the states in the state memory 31 that correspond to a particular example state. This list is stored in the order memory 43, which is used by the KL module 45. The order memory 43 is configured to store the location of the states in the state memory 31 that have the same bit string pattern on their visible bits, which enables the KL module 45 more easily to calculate the KL 49 and dKL 47.

An energy module 39 is provided, and is configured to calculate the energy of the states in the state memory 31. The energy module 39 can calculate the energy based on the updated parameter vector stored in the parameter memory 37 and is therefore part of the KL optimization (inner loop 19) processing. It will be appreciated therefore that no new sampling is necessary in the iterative loop; only new energies have to be calculated for a fixed number of states.

In overview, therefore, the computational module 15 operates in the learning phase to iteratively compute an optimized parameter vector using a set of samples buffered in the state memory 31. The sampling module 13 can resample using the current parameter vector whilst the optimization (inner loop 19) processing is ongoing, in asynchronous fashion, and generate new samples which are buffered in the sample memory 25, 27 for updating the state memory 31. Sampling and optimization can be performed in parallel.

Prediction Phase

The aim of the prediction phase is to correlate an input pattern applied to a subset of the visible units 3 with the most likely output pattern. The parameter vector optimized in the learning stage is used for this purpose. In practice, a subset of the visible units 3 is selected to be the input units with the remaining units being the output units. The input units are fixed to a given pattern of 0s and 1s. The system when run in the prediction phase generates a probability distribution over the output units. The input pattern could be a representation of an image, for example, with the output pattern being a label, or vice versa.

Referring to FIG. 6, a clamping module 51 is provided which receives as input a fixed input pattern and part of the optimized parameter vector obtained in the learning stage. The clamping module 51 is configured to calculate the biases on the hidden units 5 resulting from fixing the input pattern combined with the parameter vector that has been determined in the learning phase to work for the classification problem at hand. The result is a clamped parameter vector which is input to the parameter memory 37, and provides the input to the sampling module 13. In the prediction phase, the samplers 21, 23 in the sampling unit operate as before, taking the clamped parameter vector as input from the computational module 15. In the computational module 15, the sample memories 25, accumulator 29, state memory 31, sort module 33 and order memory 43 operate as before also. The sort module 33 however takes the output bits as one set of inputs, instead of the example probability distribution.

A marginalization module 53 is provided which receives as input the ordering of samples from the order memory 43. It calculates the marginal probability distribution over the output bits using the state energies and ordering of samples, therefore.

The energy module 39 in this phase is configured to calculate the energy for each entry in the state memory 31 and writes it to the energy memory, which enables more precise probabilities to be calculated in the marginalization module 53 than can be obtained from monitoring state frequencies from sampling alone.

Figure 7:
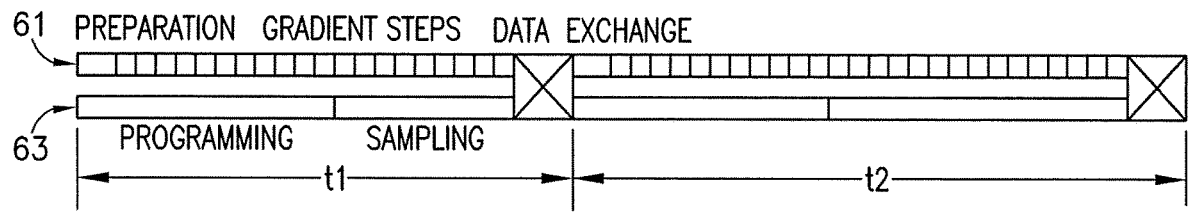
FIG. 7 is a schematic timing diagram showing how in the learning mode the sampling and computational modules of the hybrid system can operate simultaneously.

Referring to FIG. 7, it will be seen that the sampling module and computational module can be operated at the same time, in parallel, and in asynchronous fashion. Synchronization between the modules is only required at the point of data exchange, which occupies a small fraction of the overall processing time. As indicated, the upper portion 61 of the diagram indicates processing performed by the computational module 15, and the lower portion 63 by the sampling module 13. Two sampling periods, t1 and t2, are indicated to illustrate the process. The indicated programming time relates to the physical implementation of the sampler, for example translating the parameter vector into voltages or currents. During the time when the computational module 15 is processing the samples stored in the state memory and taking the gradient steps in the KL optimization, the sampling module 13 is able to receive a new parameter vector from the parameter memory 37 and commence sampling in preparation for a later data exchange. Data exchange over the data communications channel 17 can take place either when a certain number of optimization steps have been taken to generate the updated parameter vector (control by the computational module 15) or when a certain number of samples have been obtained (control by the sampling module 13). Data exchange can take place at any time there are new samples available.

An indication of the length of the sampling period t can be obtained by observing the partition function as a function of the length of the sampling period. If the partition function shows saturation, one can assume that the samples obtained provide a good approximation to the partition function.

Figure 8:
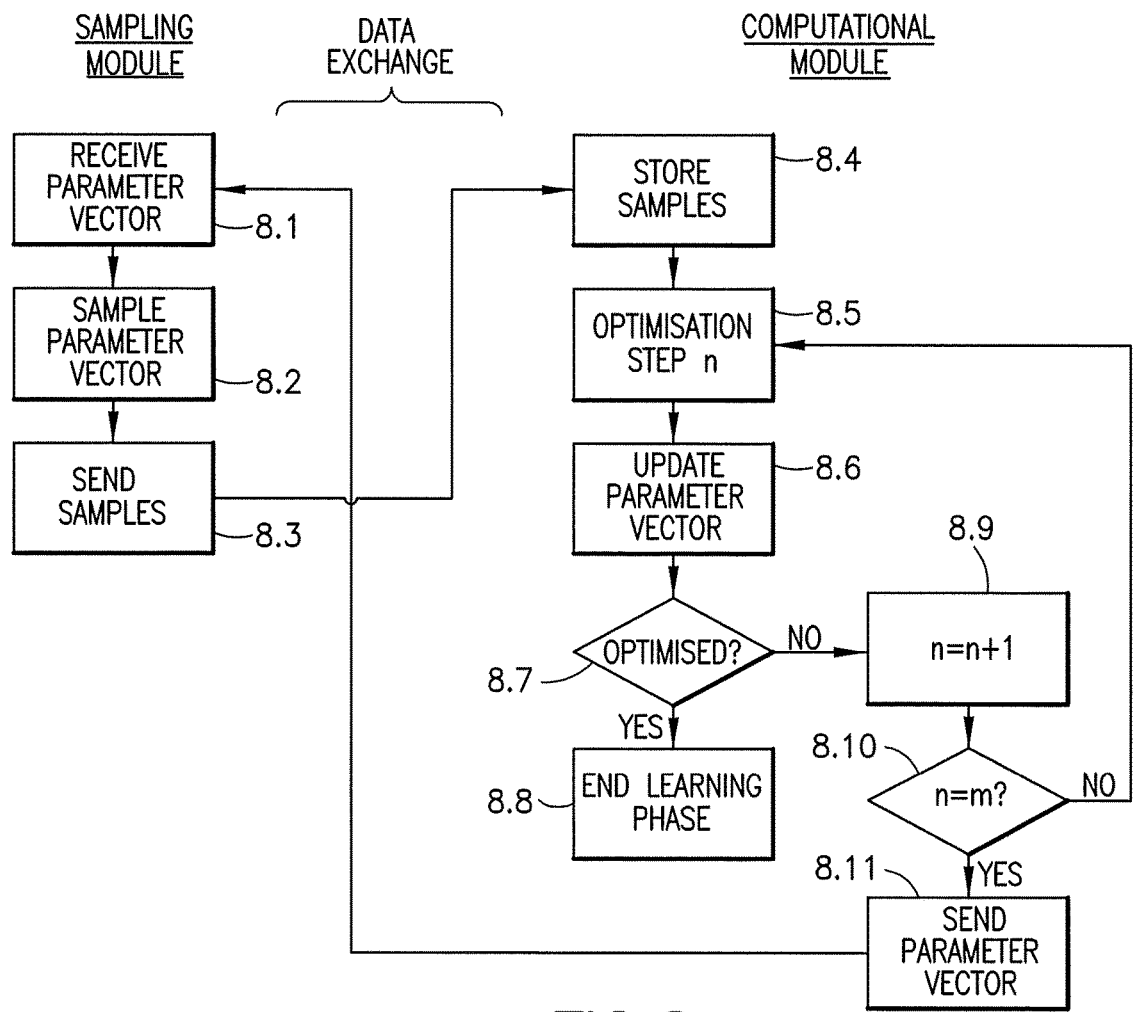
FIG. 8 is a flow diagram indicating an example of respective processing steps performed by the sampling and computational modules in learning mode of operation.

FIG. 8 is a flow diagram indicating respective processing steps performed by each of the sampling and computational modules 13, 15 in a learning stage example. In a first step 8.1 the sampling module 13 receives the parameter vector currently in the parameter memory 37 of the computational module 15. In a second step 8.2, samples are taken and, in a third step 8.3, the samples are transmitted over the data channel 17 to the computational module 15.

In the computational module, in step 8.4 the received candidate samples are stored. In step 8.5, a gradient-based optimization step is performed on the sampled data (e.g. using KL-convergence as suggested), and the parameter vector resulting from one iteration is updated in step 8.6. In step 8.7, it is determined whether a predefined optimization condition is achieved. If so, the learning process ends in step 8.8. If not, the iteration count is incremented in step 8.9. Step 8.10 determines if a predetermined iteration count n=m is reached. If not, a further optimization step proceeds by returning to step 8.5. If the count is reached, the current parameter vector is sent to the sampling module in step 8.11.

The proximity of the sampling and computational units 13, 15 can be different for the learning and prediction phases. In the learning phase, a high bandwidth connection between the two units 13, 15 is preferable, e.g. performed in the same datacenter. In the prediction phase, both low and high bandwidth connections can be used. A mobile device, for example a smart phone, may be used in the prediction phase to provide the input data and receive the output. The input and output data will be in the form of relatively short bit-strings and therefore appropriate for wireless communications.

In summary, the embodiment provides systems and methods for a hybrid approach to implementing a Boltzmann machine neural network 1, employing distinct sampling and computational modules 13, 15, each employing hardware and/or software implementations appropriate for improving their own speed, accuracy and ability to reject erroneous states. The computational module 15 is able to perform multiple optimization steps on stored samples without the need to be reprogrammed with new samples for each step, whilst the sampling module 13 is configured to start re-sampling after a predetermined period in parallel with the optimization. The computational module 15, for example, may recalculate probabilities with machine precision (32 or 64 bit) without the sampling module 13 necessarily having to be set-up for this level of precision. Data can be exchanged asynchronously, enabling each distinct module 13, 15 to operate independently according to their hardware and/or software capabilities.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
storing, by a first circuitry, a parameter vector representing an energy function of a network having a plurality of visible units connected using links to a plurality of hidden units, each link being a relationship between two units; and
receiving, by the first circuitry, state vectors from a second circuitry and applying an algorithm to produce new data,
wherein the state vectors produced for the network by the second circuitry are sampled from a probability distribution defined by the parameter vector produced by the first circuitry;
wherein the sampling further comprises generating candidate state vectors; and
wherein the sampling to generate the candidate state vectors is performed independently from an inner loop of the first circuitry used to produce the new data using the state vectors, wherein the inner loop processes the state vectors to iteratively adjust the parameter vector to converge a marginal probability distribution over the visible units towards an example probability distribution;

wherein the sampling and producing the new data is performed in parallel and asynchronously.

2. A method according to claim 1, comprising sampling and/or producing the new data until a predetermined condition is reached, at which time data is exchanged from one circuitry to the other circuitry, wherein the predetermined condition is based on the converging of the marginal probability distribution over the visible units towards the example probability distribution.

3. A method according to claim 2, wherein applying the algorithm comprises applying a learning algorithm to produce an updated parameter vector that is subsequently sent to the second circuitry for re-sampling when the predetermined condition is reached.

4. A method according to claim 3, comprising sending the updated parameter vector to the second circuitry for re-sampling when a predetermined plural number of iterations of the learning algorithm have been performed.

5. A method according to claim 1, wherein the algorithm takes as input the state vectors and the parameter vector to generate output data representing a probability distribution over all possible states of the visible units.

6. A method according to claim 1, comprising buffering the samples received prior to applying the algorithm.

7. A method according to claim 1, comprising using at least two samplers to generate the state vectors and, prior to applying the algorithm, receiving the sampled output from each and removing duplicates.

8. A method according to claim 1, wherein the second circuitry is implemented as a quantum annealing machine.

9. A system comprising:
a first circuitry configured to store a parameter vector representing an energy function of a network having a plurality of visible units connected using links to a plurality of hidden units, each link being a relationship between two units; and
wherein the first circuitry is further configured to receive state vectors from a second circuitry and to apply an algorithm to produce new data, wherein state vectors produced for the network by the second circuitry are sampled from a probability distribution defined by the parameter vector produced by the first circuitry;
wherein the sampling further comprises generating candidate state vectors; and
wherein the sampling to generate the candidate state vectors is performed independently from an inner loop of the first circuitry used to produce the new data using the state vectors, wherein the inner loop processes the state vectors to iteratively adjust the parameter vector to converge a marginal probability distribution over the visible units towards an example probability distribution;
wherein the sampling and producing the new data is performed in parallel and asynchronously.

10. A system according to claim 9, wherein the circuitries are configured to sample and/or produce the new data until a predetermined condition is reached, at which time data is exchanged between the two circuitries, wherein the predetermined condition is based on the converging of the marginal probability distribution over the visible units towards the example probability distribution.

11. A system according to claim 10, wherein the first circuitry is configured to apply a learning algorithm to produce an updated parameter vector and subsequently to send it to the second circuitry for re-sampling when the predetermined condition is reached.

12. A system according to claim 11, wherein the first circuitry is configured to send the updated parameter vector to the second circuitry for re-sampling when a predetermined plural number of iterations of the learning algorithm have been performed.

13. A system according to claim 9, wherein the first circuitry is configured to take as input the state vectors and the parameter vector, and to generate output data representing a probability distribution over all possible states of the visible units.

14. A system according to claim 9, wherein the first circuitry is configured to buffer the samples received prior to applying the algorithm.

15. A system according to claim 9, wherein the second circuitry comprises at least two samplers configured to generate the state vectors and, prior to applying the algorithm, to receive the sampled output from each and to remove duplicates.

16. A system according to claim 9, wherein the first and second circuitries are implemented on different hardware circuitries having their own microprocessor or microcontroller.

17. A system according to claim 9, wherein the second circuitry is implemented as a quantum annealing machine.

18. A non-transitory computer-readable storage medium having stored thereon computer-readable code, which, when executed by computing apparatus, causes the computing apparatus to perform a method comprising:
storing, by first circuitry, a parameter vector representing an energy function of a network having a plurality of visible units connected using links to a plurality of hidden units, each link being a relationship between two units; and
receiving, by the first circuitry, state vectors from second circuitry and applying an algorithm to produce new data,
wherein the state vectors produced by the second circuitry are sampled from a probability distribution defined by the parameter vector produced by the first circuitry; and
wherein the sampling further comprises generating candidate state vectors; and
wherein the sampling to generate the candidate state vectors is performed independently from an inner loop of the first circuitry used to produce the new data using the state vectors, wherein the inner loop processes the state vectors to iteratively adjust the parameter vector to converge a marginal probability distribution over the visible units towards an example probability distribution;
wherein the sampling and producing the new data is performed in parallel and asynchronously.

* * * * *